No. 775,648. PATENTED NOV. 22, 1904.
F. L. FINNEGAN.
PROTECTIVE VALVE COUPLING FOR GAS METERS.
APPLICATION FILED JUNE 30, 1904.
NO MODEL.

WITNESSES:
Edwin L. Jewell
J. H. Burgess Jr.

INVENTOR
Francis L. Finnegan
BY
Wallace Greene,
Attorney.

No. 775,648. Patented November 22, 1904.

UNITED STATES PATENT OFFICE.

FRANCIS L. FINNEGAN, OF PHILADELPHIA, PENNSYLVANIA.

PROTECTIVE VALVE-COUPLING FOR GAS-METERS.

SPECIFICATION forming part of Letters Patent No. 775,648, dated November 22, 1904.

Application filed June 30, 1904. Serial No. 214,752. (No model.)

*To all whom it may concern:*

Be it known that I, FRANCIS L. FINNEGAN, a citizen of the United States, residing at Philadelphia, in the county of Philadelphia and State of Pennsylvania, have invented new and useful Improvements in Protective Valve-Couplings for Gas-Meters, of which the following is a specification.

The object of this invention is to provide inexpensive devices which may be readily attached to certain very common forms of gas-meters to render them proof against certain fraudulent practices of unscrupulous consumers of gas.

Where meters such as are referred to are in common use, it is possible to cut off the flow of gas to the meter and then disconnect the delivery-pipe and this being done to insert in the delivery-passage of the meter a very small pliable wire and force it into the delivery-registering apparatus in such manner as to prevent the registration of passing gas. The wire being left in position, the delivery-pipe being reconnected, and the gas being turned on or delivered to the meter an indefinite amount of gas may be used without affecting the registering apparatus. If the fraud be begun after a certain amount of gas has been registered subsequent to the last reading of the meter by the gas company's representative or if during each month the meter be allowed to register some part of the gas consumed, it may be a long time before the company has reason to suspect the fraud, and if at any time it is suspected and the meter is taken out the discovery of the wire is by no means proof that the particular consumer is responsible for its presence. In certain cities the evil has grown to large proportions in spite of expensive efforts to detect and punish the wrongdoers. It is of course quite possible to use meters which do not admit of such fraudulent manipulation; but it is plain that to replace the many thousands of meters would involve a large outlay. Instead of using the pliable wire some disconnect the meter entirely and pour into it a thick or viscous fluid and by inverting the meter cause the same to flow into the registering devices and by obstructing their movement partially or wholly prevent registering. Usually the meter is not such that either the wire or the liquid method can be employed on the side of the entering gas; but either is readily employed successfully upon the delivery side.

Figure 1:
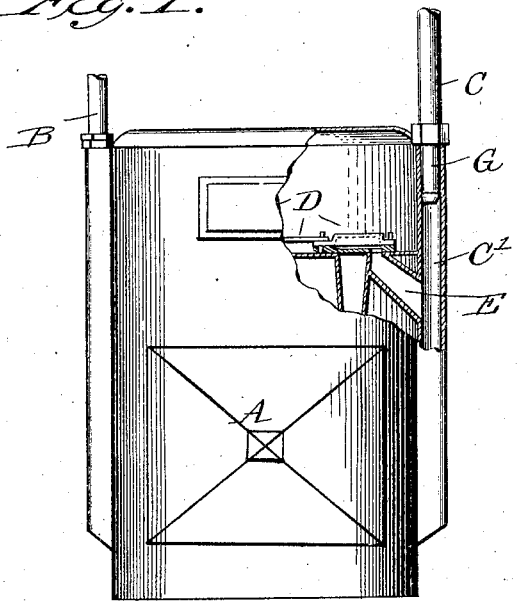
Figure 2:
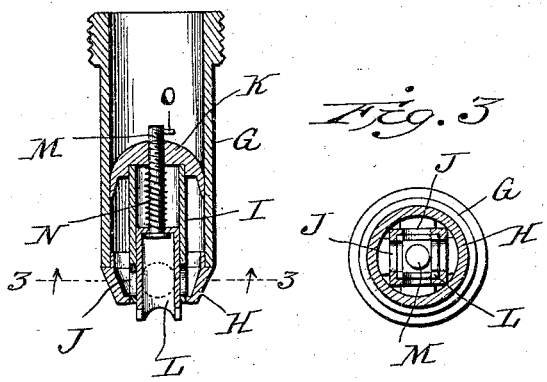
Figure 3:
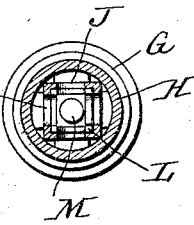
Figure 4:
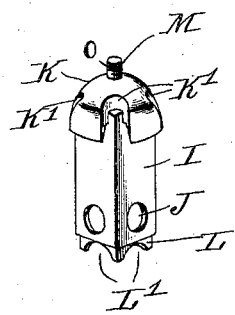

In the accompanying drawings, Figure 1 is a side elevation, partly in section, showing a very common form of meter. Fig. 2 is an axial section of a certain tube and valve therein to be inserted and permanently fixed in the delivery pipe or duct of the meter. Fig. 3 is a section on the line 3 3, Fig. 2. Fig. 4 is a perspective view of the valve of Figs. 2, 3.

In the figures, A represents a meter having an inlet-pipe B and a discharge-pipe C, with an intermediate registering apparatus D of the common slide-valve form, from which gas passes to the pipe C through a duct E and the passage C'. Ordinarily the delivery-pipe is attached by a threaded union near the meter in such manner that it forms a continuation of the passage C'. To obstruct this passage and prevent anything from passing to the registering mechanism through this passage, I provide a thimble G, fitting in this passage and threaded at its outer end to receive the pipe C. In the lower end of this thimble is fixed a cap H, having a central opening in which is fixed an upwardly-extending sleeve I, provided near its lower end with lateral perforations J and having its upper end closed by an overhanging cap K, which fits and slides in the thimble and is cut away at points K' K' not vertically above the apertures J. In this sleeve slides a tubular valve L, closed above by a perforated wall and having side walls which close the apertures when the valve is depressed. The walls are shown as cut away at L', and when these cut-away portions are brought into registry with the apertures, respectively, by raising the valve gas may pass from the interior of the valve through the apertures and be discharged through the pipe C. The weight of the valve when the movement is vertical tends to keep the apertures closed; but the pressure of the gas in the mains is sufficient to keep it open whenever gas is allowed to be discharged from the meter.

For the reason, among others, that the meter may not always be so placed that gravity tends to close the valve I provide a very light spring which always tends to close it. As shown, a headed and threaded stud M is passed loosely through the aperture in the top of the valve and through a correspondingly-threaded aperture in the sleeve-cap, and upon this stud is placed a light coiled spring N, which acts against the cap and tends to resist upward movement of the valve.

Whenever the gas is cut off from the meter, as it must be practically before disconnecting the delivery-pipe, either gravity or the spring, or both, will close the valve and effectually prevent a wire or the like from passing inward even if the sleeve-cap did not and with equal certainty prevent any thick viscous liquid from reaching the registering apparatus. The effect of such a liquid as would naturally be used would be to permanently seal the valve, and thus put the meter out of service, cutting off the supply of gas, registered or not, until by opening the meter the fraud is made apparent.

Practically the thimble and all parts therein are assembled in the factory, and it is a very simple matter to insert the whole and solder it fast in any suitable meter. The soldering herein mentioned is understood to include "hard-soldering" or brazing, and obviously other or additional means may be employed to make removal of the valve practically out of the question for the consumer.

The spring-carrying stud permits ready adjustment of the travel of the valve and of the spring-resistance and also allows the valve or spring to be readily removed or replaced should it be necessary to make repairs. The stud bears at its upper end a pin O, which facilitates adjusting from the exterior and at the same time prevents the stud from being screwed out of the cap, disconnecting the parts.

What I claim is—

1. As an article of manufacture, a thimble adapted to be non-removably fixed in the outer end of the eduction-passage of a gas-meter and containing a cut-off valve, a spring yieldingly opposing the opening of the valve by outward gas-pressure, and a non-removable shield secured in the outer end of the thimble to protect both valve and spring.

2. A thimble adapted to be non-removably fixed in the outer end of the eduction-passage of a gas-meter, a cut-off valve in the thimble, a spring yieldingly opposing the opening of the valve by outward gas-pressure, a shield between the valve and the outer end of the thimble, protecting the valve from attack through said outer end, and devices accessible from said outer end, for adjusting the force of said spring.

3. The combination with a meter-case, of a thimble non-removably fixed in the outer end of the eduction-passage and adapted for detachably engaging a service-pipe, an outwardly-opening valve secured in said thimble, a spring yieldingly resisting the opening of the valve by gas-pressure from the meter side, and a shield non-removably fixed in the thimble between the valve and the thimble's outer end, whereby the service-pipe may be readily removed without permitting tampering with the registering devices.

4. The combination with a meter-case having a suitable eduction-passage, of a cut-off valve non-removably secured in said passage and adapted to be held open by gas-pressure from the meter side, a spring arranged to close the valve when gas ceases to be consumed, and a protecting-shield non-removably secured in the passage on the discharge side of the valve and adapted to prevent tampering with the valve or spring.

5. The combination with a thimble adapted to fit and be non-removably fixed in the outer portion of the eduction-passage of a gas-meter, of a laterally-perforated sleeve fixed in the thimble and closed at its outer end, a non-revoluble valve sliding in the sleeve to open and close the lateral apertures, and a shield secured in the thimble on the discharge side of the valve and provided with passages out of longitudinal registration with said apertures, substantially as set forth.

6. For guarding the registering devices of a gas-meter, a thimble adapted to be permanently fixed in the delivery-passage of the meter, a laterally-perforated sleeve fixed in said thimble and closed at its outer end, and a valve sliding in the sleeve into and out of position for closing the perforations.

In testimony whereof I have signed my name to this specification in the presence of two subscribing witnesses.

FRANCIS L. FINNEGAN.

Witnesses:
PHIL. C. TOEHL,
THOS. FINNEGAN.